United States Patent [19]

Ohmura et al.

[11] 4,339,555
[45] Jul. 13, 1982

[54] PROCESS FOR THE PRODUCTION OF A POLYAMIDE BASE RESIN COMPOSITION

[75] Inventors: Yasuhiro Ohmura; Seiichiro Maruyama; Hiroyuki Kawasaki, all of Kitakyushu, Japan

[73] Assignee: Mitsubishi Chemical Industries, Ltd., Tokyo, Japan

[21] Appl. No.: 200,579

[22] Filed: Oct. 24, 1980

[30] Foreign Application Priority Data

Nov. 21, 1979 [JP] Japan ............................ 54-151077

[51] Int. Cl.$^3$ .............................................. C08L 77/00
[52] U.S. Cl. ........................................ 525/66; 525/183
[58] Field of Search .............................................. 525/66

[56] References Cited

U.S. PATENT DOCUMENTS

| | | | |
|---|---|---|---|
| 3,250,823 | 5/1966 | Zeitlin | 525/66 |
| 3,974,234 | 8/1976 | Brinkmann | 525/66 |
| 4,080,349 | 3/1978 | Wurmb | 525/66 |
| 4,174,358 | 11/1979 | Epstein | 525/183 |
| 4,251,644 | 2/1981 | Joffrion | 525/66 |

FOREIGN PATENT DOCUMENTS

| | | | |
|---|---|---|---|
| 9757 | 4/1980 | European Pat. Off. | 525/66 |
| 2420942 | 11/1974 | Fed. Rep. of Germany | 525/66 |
| 2740092 | 3/1978 | Fed. Rep. of Germany | |
| 55-09661 | 1/1980 | Japan | |
| 55-09662 | 1/1980 | Japan | |
| 55-36279 | 3/1980 | Japan | 525/66 |
| 1403797 | 8/1975 | United Kingdom | 525/66 |

OTHER PUBLICATIONS

Omura: Chemical Abstracts, vol. 88, (1978) Abstract No. 106248u.
Omura: Chemical Abstracts, vol. 90 (1979) Abstract No. 72921g.
Omura: Chemical Abstracts, vol. 90 (1979) Abstract No. 104986a.

*Primary Examiner*—Paul Lieberman
*Attorney, Agent, or Firm*—Oblon, Fisher, Spivak, McClelland & Maier

[57] ABSTRACT

A polyamide based resin composition is prepared mixing a resin composition with a urea compound of the formula: $R^2$—NHCONH—$R^1$—NHCONH—$R^3$ wherein $R^1$ is an aromatic hydrocarbon group and $R^2$ and $R^3$ are both aliphatic groups of 8 to 32 carbon atoms, said resin composition being prepared by melt mixing 99 to 40 parts by weight of a polyamide resin and 1 to 60 parts by weight of a modified ethylene copolymer prepared by graft copolymerizing a copolymer of ethylene and an α-olefin of at least three carbon atoms with an α,β-unsaturated carboxylic acid or derivative thereof.

10 Claims, No Drawings

PROCESS FOR THE PRODUCTION OF A POLYAMIDE BASE RESIN COMPOSITION

BACKGROUND OF THE INVENTION

The present invention relates to a polyamide base resin composition, and particularly to a polyamide base resin composition having outstanding impact resistance and mold releasing qualities.

Description of the Prior Art

Polyamide plastics are widely used for engineering purposes because of their excellent physical properties. However, they have the drawback that their shock resistance is poor. In order to improve the shock resistance of polyamide resins, a method has been proposed in which modified ethylene copolymer prepared by the graft-copolymerization of a copolymer of ethylene and a α-olefin having 3 or more carbon atoms with an α, β-unsaturated carboxylic acid, is melt mixed with a polyamide (Japanese Patent Application No. 82737 of 1978). By this method it is possible to obtain a polyamide resin composition having outstanding shock resistance. However, the mold releasing qualities of the product tend to deteriorate as the amount of the modified ethylene copolymer in the product increases. A need therefore continues to exist for a polyamide product of improved mold releasing properties.

SUMMARY OF THE INVENTION

Accordingly, one object of the present invention is to provide an industrially valuable polyamide base resin composition having good shock resistance and mold releasing qualitites.

Briefly, this object and other objects of the present invention as hereinafter will become more readily apparent can be attained by a process for preparing a polyamide based resin composition comprising mixing a resin composition with a urea compound of the formula: $R^2$—NHCONH—$R^1$—NHCONH—$R^3$, wherein $R^1$ is an aromatic hydrocarbon group and $R^2$ and $R^3$ are both aliphatic groups of 8 to 32 carbon atoms, said resin composition being prepared by melt mixing 99 to 40 parts by weight of a polyamide resin and 1 to 60 parts by weight of a modified ethylene copolymer prepared by graft copolymerizing a copolymer of ethylene and an α-olefin of at least three carbon atoms within an α,β-unsaturated carboxylic acid or derivative thereof.

DETAILED DESCRIPTION OF THE PREFERRED EMBODIMENTS

In the extensive research leading to the present invention, it has been found that the mold releasing qualities of a polyamide resin composition prepared by melt mixing a polyamide and a modified ethylene copolymer, can be substantially improved by combining the composition with a certain urea compound. The presence of the urea compound also results in improvement of the shock resistance of the product.

The polyamide starting material used to prepare the polyamide based resin composition of the present invention may be a polyamide prepared by polycondensation of, e.g., not less than a three membered ring lactam, a polymerizable ω-amino acid, or a dibasic acid with a diamine. Particularly, suitable polyamides include polymers of ε-caprolactam, aminocaprolactam, enanthlactam, 7-aminoheptanoic acid, 11-aminoundecanoic acid, 9-aminononanoic acid α-pyrrolidone, α-piperidone, and polymers or co-polymers prepared by the polycondensation of a diamine such as hexamethylenediamine, nonamethylenediamine, undecamethylenediamine, dodecamethylenediamine or m-xylylenediamine with a dicarboxylic acid such as terephthalic acid, isophthalic acid, adipic acid, sebacic acid, dibasic dodecanoic acid or glutaric acid, these polymers include nylon 4, 6, 7, 8, 11, 12, 6.6, 6.9, 6.10, 6.11, 6.12, 6T, 6/6.6 6/12 and 6/6T.

The modified ethylene copolymer which is blended with the polyamide starting material, is a product obtained by the graft-copolymerization of a copolymer of ethylene and an α-olefin having 3 or more carbon atoms (hereinafter referred to as "a non-modified ethylene copolymer") with from 0.05% to 1.5% by wt. of an α, β-unsaturated carboxylic acid or its derivative. The non-modified ethylene copolymer as the starting material of the modified ethylene copolymer may be prepared, for instance, by copolymerizing at least 50 mole %, preferably 80 to 95 mole %, of ethylene with not more than 50 mole %, preferably 20 to 5 mole %, of an α-olefin having 3 or more carbon atoms in the presence of a Ziegler-Natta-type catalyst, particularly a catalyst formulated from a vanadium compound such as a vanadium oxytrichloride or vanadium tetrachloride and an organic aluminum compound. Suitable α-olefin reactants include α-olefins having 3 or more carbon atoms such as propylene, butene-1, hexene-1, decene-1, 4-methylbutene-1, 4-methylpentene-1, and the like. Propylene and butene-1 are preferred. Suitable commercially available non-modified ethylene copolymers include those in a series of resins sold by Mitsui Petrochemical Industries, Ltd. under the trademark "TAFMER", for instance, the TAFMER A series (ethylene-butene-1 copolymers) such as TAFMER A4085, A 4090, and A20090, and the TAFMER P series (ethylene-propylene copolymers) such as TAFMER P 0280, P 0480, P0680, and P 0880. Suitable α, β-unsaturated carboxylic acids or derivatives thereof (hereinafter referred to simply as "unsaturated carboxylic acid") which can be graft-copolymerized on the non-modified ethylene copolymer include acrylic acid, methacrylic acid, ethacrylic acid, maleic acid, fumaric acid and the like and anhydrides and esters thereof. Among these materials maleic anhydride is particularly preferred.

The amount of the unsaturated carboxylic acid which is graft-copolymerized on the non-modified ethylene copolymer normally ranges from 0.05 to 1.5% by weight, based on the weight of the non-modified ethylene copolymer. If the amount of acid or derivative used is too small, the shock resistance of the polyamide resin will not be improved sufficiently. On the other hand, if the amount of acid or derivative used is too great, the polyamide base resin composition tends to have an undesirable color.

The graft-copolymerization is carried out by normal methods, for instance, by adding the unsaturated carboxylic acid to the non-modified ethylene copolymer and melt mixing the mixture normally at a temperature of 150° to 300° C. In order to facilitate the graft-copolymerization reaction, an organic peroxide such as α, α'-bis-t-butyl peroxy-p-diisopropyl benzene may be added in an amount of 0.001 to 0.05% by weight based on the non-modified ethylene copolymer.

The modified ethylene copolymer starting material which is blended with the polyamide should preferably have a crystallinity (as measured by the X-ray method described in the Journal of Polymer Science, Vol. XVII (1955) pages 17 to 26) of 75% or less, preferably 1 to 35%, and a melt index (as measured at 190° C. by ASTM D 1238 57T) of 0.01 to 50, preferably 0.1 to 20. In order to obtain a modified ethylene copolymer having the desired crystallinity and melt index characteristics, a non-modified ethylene copolymer having a crystallinity and melt index within the above range should be used.

The melt mixing of the polyamide resin starting material with the modified ethylene copolymer starting material is conducted in a conventional manner, for instance, by using a single axis or multi-axes screw-type extruder or a double screw mixer at a temperature of 180° to 300° C., preferably 200° to 280° C., for 0.5 to 15 minutes, preferably 1 to 10 minutes. The proportion of the polyamide resin relative to the modified ethylene copolymer during melt mixing ranges from 1 to 60 parts by weight of the modified ethylene copolymer to 99 to 40 parts by weight of the polyamide resin, preferably 2.5 to 50 parts by weight of the modified ethylene copolymer to 97.5 to 50 parts by weight of the polyamide resin. If the amount of the modified ethylene copolymer used is too small, improvement in the shock resistance of the polyamide product can not be expected. On the other hand, if the amount of the modified ethylene copolymer used is too great, improvement in the mold releasing quality of the product can not be expected.

With regard to the urea compound which is mixed with the polyamide product, suitable compounds include those of the formula: $R^2$—NHCONH—$R^1$—NHCONH—$R^3$ wherein $R^1$ is a divalent aromatic hydrocarbon group such as

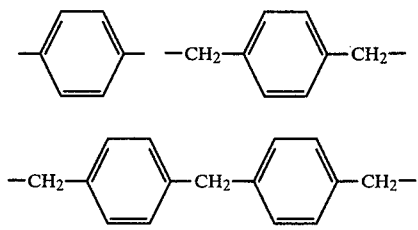

and each of $R^2$ and $R^3$ is a straight chain or branched chain aliphatic hydrocarbon group having 8 to 32, preferably 12 to 18, carbon atoms. Suitable $R^2$ and $R^3$ groups include octadecyl, dodecyl, hexadecyl, ethylhexadecyl and the like. Radicals $R^2$ and $R^3$ may be the same or different. Representative urea compounds include the following:

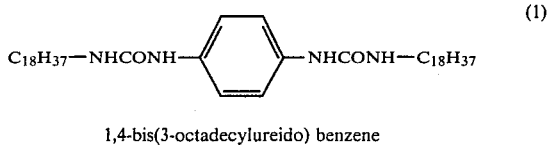

1,4-bis(3-octadecylureido) benzene

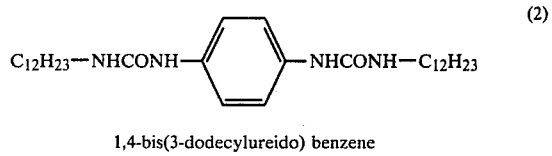

1,4-bis(3-dodecylureido) benzene

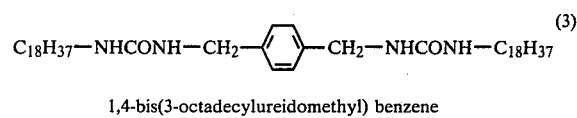

1,4-bis(3-octadecylureidomethyl) benzene

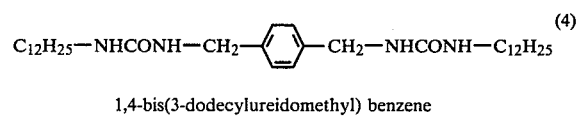

1,4-bis(3-dodecylureidomethyl) benzene

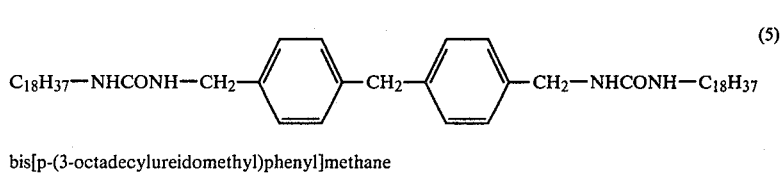

bis[p-(3-octadecylureidomethyl)phenyl]methane

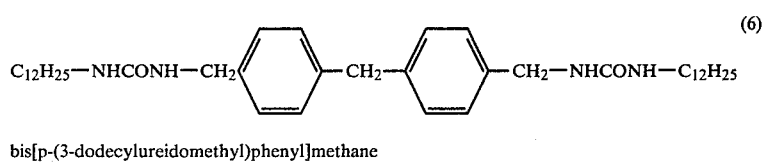

bis[p-(3-dodecylureidomethyl)phenyl]methane

In a method of preparing the polyamide based resin composition of the present invention, the urea compound is added to the resin composition obtained by melt mixing. If the melt mixing of the polyamide resin and the modified ethylene copolymer is conducted in the presence of the urea compound, no improvement in the mold releasing quality of the product resin composition can be expected and the shock resistance is even lowered. Thus, it is essential that the addition of the urea compound be conducted after completion of the melt mixing of the polyamide resin and the modified ethylene copolymer. Specifically, this can be done, for instance, by adding the urea compound upon expiration of a predeterimined period of time for the melt mixing of the resin and the modified ethylene copolymer, or by dry blending powders of the resin composition obtained by melt mixing and the urea compound with use of a blender or a mixer, or by melt mixing the powders with the use of an extruder.

The amount of the urea compound mixed with the polyamide is not critical. Preferably the amount is 0.005 to 5 parts by weight, more preferably 0.01 to 1 part by weight and most preferably 0.03 to 0.3 part by weight, relative to 100 parts by weight of the resin composition obtained by the melt mixing. If the amount of the urea compound used is too small, no adequate improvement in the mold releasing quality or the shock resistance of the polyamide based resin composition can be expected. On the other hand, if the amount of the urea compound used is too great, no further improvement is expected and a phase separation between the urea compound and the resin is likely to occur. This gives rise to an inferior outer appearance of shaped polyamide articles or to deterioration in the physical properties of the polyamide based resin composition.

In another embodiment of the present invention the mold releasing qualities and the shock resistance of the polyamide based resin composition can be further improved by incorporating therein a nucleating agent, which promotes the forming cycle. Suitable nucleating agents include the likes of silica, alumina, magnesia, silica-aluminas such as kaolin, or silica-magnesias such as talc, organic bentonites, calcium silicate, graphite and molybdenum disulfide. The nucleating agent should have a particle size of 0.1 to 50 microns, preferably 0.5 to 20 microns, and the amount to be added should be 0.002 to 1.0 part by weight, preferably 0.005 to 0.7 part by weight, relative to 100 parts by weight of the resin composition obtained by melt mixing.

In still another embodiment of the present invention, it is possible to further add other types of resins to the polyamide based resin composition to the extent that the physical properties of the polyamide based resin composition are not impaired. Suitable supplemental resins include polyolefins, polyesters, polycarbonates, polystyrene, ABS, and the like. Non-flammable agents such as organic halides, cyanuric acid, melamine, melamine cyanurate and the like can also be incorporated in the product as well as reinforcing agents such as glass fiber and carbon fiber, plsticizers such as N-butylbenzenesulfonamide, and additives such as dyestuffs or pigments. The polyamide based resin composition prepared by the present invention has outstanding mold releasing qualities and shock resistance, and therefore it has a wide range of applications as an engineering plastic, and is of great industrial value.

Having generally described the invention, a further understanding can be obtained by reference to cerain specific examples which are provided herein for purpose of illustration only and are not intended to be limiting unless otherwise specified.

In the examples, the terms "parts" and "%" indicate "parts by weight" and "% by weight", respectively. In addition, the tensile yield strength, the tensile breaking strength and the tensile breaking elongation were measured by ASTM D 638. The flexural strength and the flexural modulus were measured by ASTM D 790. The Izod impact strength was measured by ASTM D 256. The mold releasing qualities were determined with the use of a mold comprising a frame of 80 mm × 80 mm within which ribs of 5 mm × 4 mm were placed every 15 mm. Molding of a resin was performed by continuously injection molding a resin at a temperature of 250° C. and at a mold temperature of 80° C. until failure in mold releasing was observed. The mold releasing quality was expressed by the number of shots performed until failure was observed.

The following is an example of a method of preparing a modified ethylene copolymer:

In a Henshell mixer, 100 parts of an ethylene-butene-1 copolymer having a crystallinity of 20% and a melt index of 3.6 and containing 14 mole % of butene-1, 0.025 part of α,α'-bis-t-butylperoxy-p-diisopropylbenzene dissolved in a small amount of acetone and 0.5 part of maleic anhydride were blended, and the blend thus obtained, was melt mixed at 230° C., extruded and pelletized with use of an extruder having an inner diameter of 40 mm and an L/D=28, thereby obtaining a modified ethylene copolymer. A portion of the pellets was crushed and unreacted maleic anhydride was extracted by acetone. After press forming, maleic anhydride was quantitatively analysed for by means of its infrared spectrum, which showed that 0.35% of maleic anhydride was graft-polymerized.

EXAMPLE 1 AND COMPARATIVE EXAMPLES 1 AND 2

With the use of a Vent type extruder of 40 mmφ diameter, 80 parts of nylon 6 (made by Mitsubishi Chemical Industries, Limited and available under the tradename of Novamide 1010) having a relative viscosity of 2.5 (measured at 25° C. with respect to a 1% polymer solution in 98% sulfuric acid) and 20 parts of the modified ethylene copolymer prepared by the example above were melt mixed at a cylinder temperature of 250° C. with the Vent held at a reduced pressure of 30 mmHg. The product was extruded as a strand at a resin extrusion rate of 7 kg/hr and then pelletized. To 100 parts of the pellets thus obtained, 0.15 part of 1,4-bis(3-octadecylureidomethyl) benzene (made by Nippon Kasei K.K., Hacreen SX) was added, and dry blended for 10 minutes in a tumbler. Thereafter, injection molding was continuously performed with the use of an injection molding machine (made by Nissei Jushi K.K., TS-100 Model) at a resin temperature of 250° C. and a mold temperature of 80° C. at a molding cycle of 50 minutes. The results are shown in Table 1. For the purposes of comparison, the results obtained from the cases wherein 1,4-bis(3-octadecylureidomethyl) benzene was not added and wherein at the time of the melt mixing of the nylon 6 and the modified ethylene copolymer, 1,4-bis-(3-octadecylureidomethyl) benzene was added and pelletized and injection molded, are also shown.

TABLE 1

| | Example 1 | Comparative Example 1 | Comparative Example 2 |
|---|---|---|---|
| 1,4-bis(3-octadecylureidomethyl) benzene added | Prior to injection molding | None | At the time of melt mixing the nylon 6 and the modified ethylene copolymer |
| Mold releasing quality (number of shots) | 30 | 4 | 5 |
| Izod Impact Strength ¼" (kg . cm/cm) | 57 | 40 | 13 |
| ⅛" (kg . cm/cm) | 72 | 53 | 17 |
| Tensile yield strength (kg/cm²) | 520 | 530 | 500 |
| Tensile breaking strength (kg/cm²) | 600 | 500 | 470 |
| Tensile breaking elongation (%) | 200 | 140 | 43 |
| Flexural strength (kg/cmc²) | 600 | 650 | 600 |
| Flexural Modulus (kg/cm²) | 15300 | 16700 | 15700 |

EXAMPLE 2

To 100 parts of the same pellets described in Example 1 consisting of a melt mixture of nylon 6 and the modified ethylene copolymer, 0.15 part of 1,4-bis-(3-octadecylureidomethyl) benzene and 0.1 part of kaolin (made by Tsuchiya Kaolin K.K., Filler) were dry blended and injection molded in the same manner as shown in Example 1. The molding releasing quality of the composition thus obtained was so good that the continuous molding of more than 50 shots was possible. The Izod impact strength was 63 kg.cm/cm at $\frac{1}{2}''$, and 68 kg.cm/cm at $\frac{1}{8}''$, the tensile yield strength was 510 kg/cm$^2$, the tensile breaking strength was 500 kg/cm$^2$, the tensile breaking elongation was 175%, the flexural strength was 620 kg/cm$^2$ and the flexural modulus was 16400 kg/cm$^2$.

EXAMPLE 3 AND COMPARATIVE EXAMPLES 3 AND 4

The operation was carried out in the same manner as described in Example 1 except that nylon 6.6 (made by Monsanto Company and available under a tradename of Vydine 21) was used having a relative viscosity of 2.9 instead of Nylon 6. The resin temperature of 250° C. was changed to 270° C. at the time of injection molding. The results are shown in Table 2. For the purpose of comparison, the results obtained from the cases wherein 1,4-bis-(3-octadecylureidomethyl) benzene was not added and wherein 1,4-bis-(3-octadecylureidomethyl) benzene was added at the time of the melt mixing of the nylon 6.6 and the modified ethylene copolymer, pelletized then injection molded, are also shown.

TABLE 2

| | Example 3 | Comparative Example 3 | Comparative Example 4 |
|---|---|---|---|
| 1,4-bis(3-octadecylureidomethyl) benzene added | Prior to injection molding | None | At the time of melt mixing the nylon 6.6 and the modified ethylene copolymer |
| Mold releasing quality (number of shots) | 40 | 5 | 10 |
| Izod Impact Strength $\frac{1}{2}''$ (kg . cm/cm) | 90 | 50 | 10 |
| $\frac{1}{8}''$ (kg . cm/cm) | 105 | 60 | 15 |
| Tensile yield strength (kg/cm$^2$) | 540 | 540 | |
| Tensile breaking strength (kg/cm$^2$) | 580 | 570 | 500 |
| Tensile breaking elongation (%) | 80 | 50 | 20 |
| Flexural strength (kg/cmc$^2$) | 610 | 620 | 600 |
| Flexural Modulus (kg/cm$^2$) | 16500 | 17000 | 17000 |

Having now fully described this invention, it will be apparent to one of ordinary skill in the art that many changes and modifications can be made thereto without departing from the spirit or scope of the invention set forth herein.

What is claimed as new and desired to be secured by Letters Patent of the United States is:

1. A process for the production of a polyamide based resin composition, comprising:
    (a) preparting a modified ethylene copolymer by graft polymerizing from 0.05 to 1.5% by weight of an $\alpha$, $\beta$-unsaturated carboxylic acid or derivative thereof onto an ethylene copolymer prepared by copolymerizing ethylene with an $\alpha$-olefin of at least three carbon atoms;
    (b) melt mixing from 1 to 60 parts by weight of said modified ethylene copolymer with 99 to 40 parts by weight of a polyamide resin; and
    (c) subsequently mixing from 0.005 to 5 parts by weight of a urea compound of the formula: $R^2$—NHCONH—$R^1$—NHCONH—$R^3$, wherein $R^1$ is an aromatic hydrocarbon group and $R^2$ and $R^3$ are both aliphatic groups of 8 to 32 carbon atoms, based on 100 parts by weight of said resin composition.

2. The process of claim 1, wherein said co-polymer of ethylene and an $\alpha$-olefin of at least three carbon atoms is prepared by copolymerizing 50–95 mole % of ethylene with 50-5 mole % of the $\alpha$-olefin.

3. The process of claim 1, wherein said $\alpha$-olefin is propylene.

4. The process of claim 1, wherein said $\alpha$-olefin is butene-1.

5. The process of claim 1, wherein said $\alpha$, $\beta$-unsaturated carboxylic acid or derivative thereof is maleic anhydride.

6. The process of claim 1, wherein said urea compound is 1,4-bis-(3-octadecylureidomethyl) benzene.

7. The process of claim 1, wherein the urea compound is 1,4-bis-(3-octadecylureido) benzene.

8. The process of claim 1, wherein the polyamide resin is nylon 6.

9. The process of claim 1, wherein the polyamide resin is nylon 6.6.

10. A polyamide based resin composition prepared by the process of claim 1.

* * * * *